United States Patent [19]

Davis et al.

[11] 4,028,241

[45] June 7, 1977

[54] APPARATUS FOR AND METHOD OF RECOVERING WATER USED TO BACKWASH AND RINSE A FILTER

[75] Inventors: Raymond R. Davis, Pitman; Alfred M. Langberg, Sewell; Alvin P. Debus, Pitman, all of N.J.

[73] Assignee: Hungerford & Terry, Inc., Clayton, N.J.

[22] Filed: Oct. 1, 1976

[21] Appl. No.: 728,773

Related U.S. Application Data

[63] Continuation of Ser. No. 607,496, Aug. 25, 1975, abandoned, which is a continuation of Ser. No. 490,016, July 19, 1974, abandoned, which is a continuation of Ser. No. 319,089, Dec. 27, 1972, abandoned.

[52] U.S. Cl. .................. 210/60; 210/82; 210/265; 210/275

[51] Int. Cl.² .......................... B01D 41/02

[58] Field of Search .............. 210/34, 35, 42, 49, 210/50, 63, 79–82, 195, 264, 265, 275–278, 59–61

[56] References Cited

UNITED STATES PATENTS

| 3,171,800 | 3/1965 | Rice et al. | 210/80 |
| 3,260,366 | 7/1966 | Duff et al. | 210/80 |
| 3,792,773 | 2/1974 | Ross | 210/275 |

Primary Examiner—Thomas G. Wyse
Assistant Examiner—Benoit Castel
Attorney, Agent, or Firm—Synnestvedt & Lechner

[57] ABSTRACT

A system for recovering chemically-treated water used to backwash and rinse a manganese oxide zeolite filter. The backwash and rinse waters are placed in a recovery basin, preferably with a coagulating agent, wherein the waters are agitated and then allowed to settle and thereby to separate from the water impurities removed from the filter. The backwash and rinse water so purified is then returned to the filter inlet for a normal service filtering pass through the filter. A number of filters are preferably serviced by each recovery basin, and automatic control means for the system are also disclosed.

4 Claims, 3 Drawing Figures

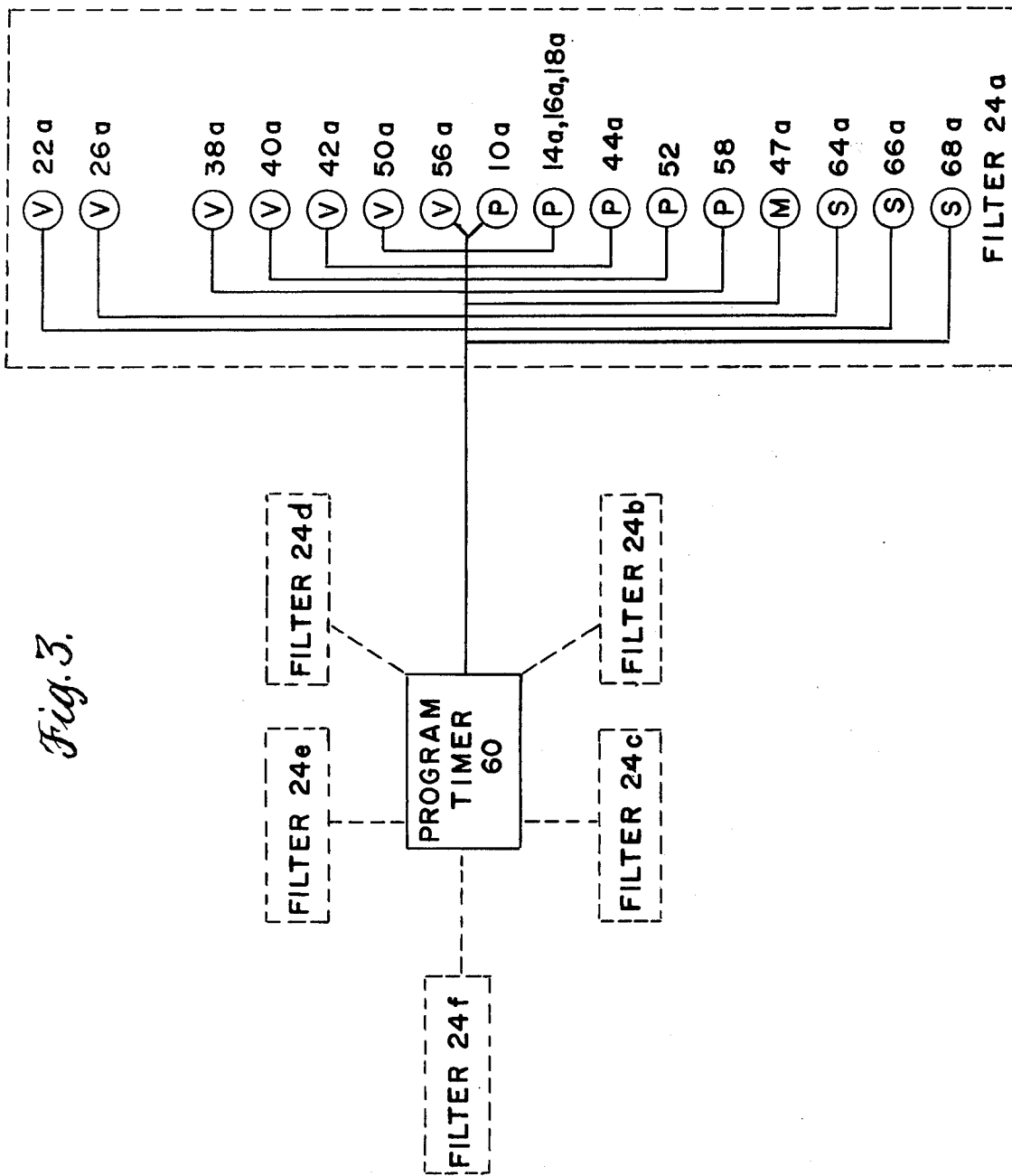

APPARATUS FOR AND METHOD OF RECOVERING WATER USED TO BACKWASH AND RINSE A FILTER

This is a continuation of application Ser. No. 607,496 filed on Aug. 25, 1975, which application in turn is a continuation of Ser. No. 490,016 filed on July 19, 1974, which application in turn is a continuation of Ser. No. 319,089 filed Dec. 27, 1972, all now abandoned.

BACKGROUND OF THE INVENTION

This invention relates generally to the water purification field. In particular, it is concerned with a system for recovering treated water used to backwash and rinse filters used to remove manganese and iron impurities from water.

It is known to add treatment chemicals to water containing iron and manganese ions and to filter the treated water to remove such ions. U.S. Pat. No. 3,167,506 to Fackler et al describes one such method in which permanganate ions are employed in conjunction with a manganese oxide zeolite filter bed. Other treatment chemicals, such as chlorine and pH adjustment chemicals like sodium hydroxide, typically are also added to the water being treated.

As the water passes through the manganese oxide zeolite bed, the iron and manganese ions dissolved therein are oxidized into an insoluble oxide and/or hydroxide either by the zeolite material operating as an oxidizing agent (in which event the filter must be periodically regenerated with a strong oxidizing agent, such as for example potassium permanganate), or by the catalytic effect of the manganese oxide zeolite bed. These oxidation mechanisms for precipitating iron and manganese ions are more fully described in the above-identified Fackler patent.

After the filtering system has been in operation for a period of time, the filter bed becomes partially clogged by the precipitates. It is thus desirable to "back wash" the filter periodically by passing treated water in the direction opposite to normal filtering flow, i.e. from the filter outlet through the filter to the filter inlet, to remove the precipitates from the filter and restore the mechanical and catalytical efficiency of the bed. In processes heretofore employed, the treated backwash water containing suspended matter has been disposed of by merely depositing it in a sewer or natural body of water.

During backwashing, the filter granules tend to become dislodged or unpacked so that the filter bed does not properly treat the first water passed through it after backwashing. It is conventional to "rinse" the filter with treated water immediately after backwashing. In rinsing, new water is passed through the filter in the direction of normal filtering flow to repack the filter granules. Heretofore, the rinse water also has been disposed of merely by depositing it in a sewer or the like.

Inasmuch as the cost of treatment chemicals used to treat the backwash and rinse water frequently amounts to on the order of 3 to 12% of the cost of operating the filtering system, such disposal of backwash water results in significant waste and lack of economy in the overall operation of the system. A concomitant disadvantage of the prior method of disposing of the backwash and rinse water is that by placing the impurities containing backwash water into sewers or the like, the water treatment system emits wastes which contribute to pollution of other water sources, besides wasting the washwater itself.

It is, therefore, desirable to provide a system for recovering the treated water used to backwash and rinse filter beds of this type.

SUMMARY OF THE INVENTION

In brief compass, the invention provides a recovery basin into which water used to backwash and rinse a manganese oxide filter is deposited. Preferably a coagulating agent such as a polyelectrolyte is added to the backwash and rinse water, the coagulating agent and water is agitated in the recovery basin, and then the precipitates or other impurities removed from the filter are allowed to settle to the bottom of the recovery basin. The treated water from which the impurities have settled is then returned to the filter inlet and passed through the filter in normal filtering operation so that the water used to backwash and rinse the filter exits from the filtering system as pure treated water.

Settling is preferred to other methods for separating the removed precipitates from the backwash and rinse water. The filter area needed to filter the impurities from backwash and rinse water would be prohibitively large and hence expensive in terms of space requirements. Centrifuging might also be employed, but the centrifuge would have to run at a very high speed so that the power requirements needed for such centrifuging would be prohibitively high and expensive. Ion exchange methods of separating impurities from water are inappropriate for removing precipitated solids from water.

It is preferred to employ a polyelectrolyte because, otherwise, the time required for the precipitates removed from the filter to settle from the backwash and rinse water would be on the order of hours, days or weeks, while on the other hand, with the polyelectrolyte, settling requires less than one to two hours.

Further in accordance with the invention, automatic control means are desirably provided for controlling the overall operation and sequence of events of the system to minimize the manpower needed to operate and supervise the system.

Accordingly, it is an object of the invention to provide a method and apparatus for recovering treated water used to backwash a manganese oxide filter.

Another object of the invention is to provide a method and apparatus for recovering water used to rinse a manganese oxide filter.

These objects and other objects, features and advantages of the invention will become more apparent as the following detailed description of the preferred embodiment thereof proceeds with continued reference to the accompanying drawings wherein:

FIG. 3 is a schematic representation of automatic control means for controlling the system shown in FIG. 2.

DETAILED DESCRIPTION OF PREFERRED EMBODIMENTS

Figure 1:
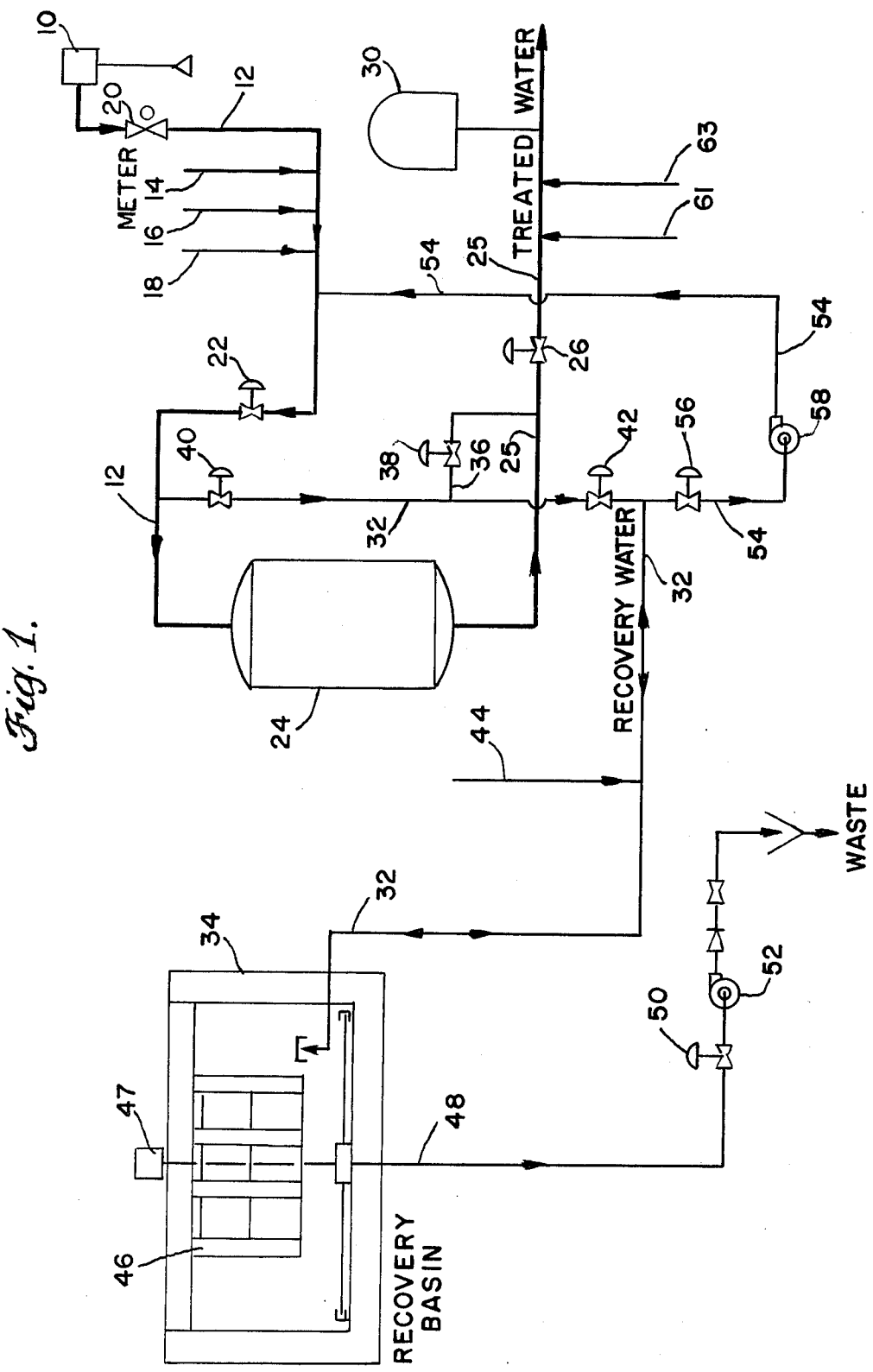
FIG. 1 is a diagrammatic representation of a system, in accordance with the invention, for recovering backwash and rinse water using a single recovery tank in conjunction with a single filter.

A wash water recovery system according to the invention for use with a single filter is illustrated diagramatically in FIG. 1, wherein arrows are used to indicate the normal flow directions through the various water lines.

Water to be treated, such as from a well, is fed into the system by inlet means inluding inlet pump 10 and inlet line 12. Treatment chemicals are added to the inlet water via means for feeding treatment chemicals including chlorine feed line 14, pH correction material feed line 16 and permanganate feed line 18. It is preferred that of the treatment chemicals, chlorine first be added to the untreated water. The preferred pH correction material to maintain the pH of the water at a level of at least 6.0 is sodium hydroxide, although it should be appreciated that other pH correction materials may also be used. The last treatment chemical added to the water is permanganate, preferably in an amount sufficient to produce a faintly pink color in the water at the entrance of the filter bed as more fully described in U.S. Pat. No. 3,167,506 to Fackler et al.

For smaller installation, chlorine feed line 14 feeds a chlorine-containing solution into line 12, although for larger installations, it is frequently more economical to use gaseous chlorine.

An inlet line meter 20 is located upstream of the feed lines 14, 16 and 18. The treatment chemical feed lines 14, 16 and 18 each includes a conventional chemical supply tank (not shown) and a controlled volume feed pump (not shown) which is electrically connected to the totalizing meter 20 so that the chemical feeds may be automatically proportioned by conventional means to the actual inlet flow rate, which sometimes varies with time. An inlet valve 22 is located downstream of the meter 20 in the inlet line 12, from whence the inlet line 12 enters the top of a filter vessel 24, within which is a bed of manganese oxide or manganese oxide zeolite. The lower portion of the filter vessel is connected to an outlet line 25 in which an outlet valve 26 is placed.

The backwashing means of the invention includes a backwash reservoir 30 located near the outlet of line 25 which fills up with treated water during service operation of the system. The backwash reservoir 30 is regulated by a conventional float switch (not shown), and is constructed and arranged to provide a heat of about 50 psi. A backwash water recovery line 32 connects the inlet line 12 at a point downstream of the inlet valve 22 with a water recovery collection basin 34 and provides means for transferring backwash water to the recovery basin.

A rinse water recovery line 36, which includes rinse water recovery valve 38, interconnects lines 25 and 32. Backwash water recovery valve 40 is interposed in line 32 between the connection of line 32 and inlet line 12 and the connection of line 32 and line 36. A recovery basin inlet valve 42 is placed in line 32 downstream of its connection with line 36.

A coagulant feed line 44 feeds into the water recovery line 32 at a point upstream from the recovery basin 34. The water recovery line 32 feeds recovered backwash and/or rinse water into the recovery basin 34, and an agitator, such as a rotatable set of paddles 46 driven by motor 47 is provided in the recovery basin to mix the coagulating agent and recovery water. At the bottom of the recovery basin is a sludge removal line 48 in which is positioned sludge removal valve 50 and sludge removal pump 52. The sludge removal line feeds to a sewer or other waste depository.

Recovered water return line 54 connects the water recovery line 32 at a point downstream of the valve 42 and the inlet line 12 at a point downstream of the meter 20. A recovered water return valve 56 and pump 58 are positioned in the line 54.

A second chlorine feed line 61 and pH correction material feed line 63 feed into the outlet line 25 at a point downstream of the outlet valve 26 for correcting the pH of the effluent to approximate neutrality.

In normal service operation, the inlet valve 22 and outlet valve 26 are open and the valves 38, 40, and 42 are closed so that untreated water (under the influence of the pump 10) passes through the inlet line 12, is treated with chemicals through feed lines 14, 16 and 18, passes into the top of the filter vessel 24, through the filter and then out the outlet line 25 as treated water. The backwash reservoir 30 is also filled during normal service operation. By virtue of the zeolite filter bed properties which tend to oxidize and filter out impurities (as more fully described in U.S. Pat. No. 3,167,506), the iron and manganese impurities in the water precipitate out and, over a period of time, tend to clog the filter so that the pressure drop across the filter increases. When the pressure drop across the filter becomes significant, it is necessary to backwash the filter periodically to remove the precipitates therefrom.

Backwashing is accomplished by closing inlet valve 22 and opening backwash water recovery valve 40 and valve 42. When the inlet valve 22 is closed, thereby cutting off the supply of water under the influence of the pump 10, the pressure of the treated water in the backwash reservoir 30 forces treated water back through outlet line 25 in reverse or backwashing flow to the bottom of the filter up through the filter to backwash the filter. The reservoir 30 is typically quite large, i.e., on the order of 1,000,000 gallons, so as to provide the serviced community with a day's supply of water as well as to provide a source of treated water for backwashing.

The backwash water leaving the top of the filter in reverse flow through inlet line 12 carries with it iron and/or manganese precipitates, which have been cleansed from the filter, and flows through water recovery line 32 to the water recovery basin 34. The coagulant agent feeding means adds a coagulating agent to the recovered water, through line 44, which agent is preferably an organic polyelectrolyte that functions to enhance agglomeration of the precipitants to decrease the time necessary for the precipitants to settle out of the recovered water in the recovery basin. A number of coagulating agents to perform this task are known to those skilled in the art. A preferred example of a coagulating agent is the potable, watergrade coagulant sold by Dow Chemical Company under the trademark "Separan NP 10," although it will be readily apparent to those skilled in the art that other coagulants such as that sold by Dow Chemical Company under the trademark "Purifloc N17," and other synthetic high molecular weight organic polymers may also be employed.

The recovered backwash water and coagulating agent are fed into the collection basin 34 where the mixture is agitated, such as for example by rotating agitating means or paddles 46, for a period of time sufficient to coagulate or agglomerate the impurities removed from the filter.

The backwashing of the filter bed tends to loosen or unpack the granules of the filter bed so that the first water passing through the bed in the filtering direction, i.e., from inlet line 12 to outlet line 25 is not filtered properly. To avoid passing impure water out of the filter bed immediately after backwashing, it is preferred to "rinse" the bed, that is to compact the filtering granules, by passing rinse water through the filter in the direction of filtering flow. To this end, the invention provides means for rinsing the filter. Rinsing is accomplished by opening the inlet valve 22 and rinse valves 38, and closing outlet valve 26, and closing valve 40 so that water coming through inlet line 12 passes through the filter vessel 24 in the direction of filtering flow to outlet line 25. The rinse water passes from outlet line 25 through rinse water line 36 and out water recovery line 32 for transfer to the collection basin 34.

The recovered backwash and preferably rinse water and coagulatng agent added thereto are agitated by the paddles 46 for a period of time in the recovery basin. After agitation has proceeded for a time sufficient to coagulate the precipitants and other impurities removed from the filter vessel 24, agitation is stopped and the impurities are allowed to settle to the bottom of the recovery basin 34.

Agitation in the basins 34 may take place while the filter 24 is being backwashed and rinsed. Once rinsing has occured, the filter is desirably returned to service operation to minimize its "down time" and settling in the basin 34 takes place while the filter 24 is in service operation.

After settling, the treated water from which impurities have been removed is transferred from the recovery basin to the inlet line 12 through water recovery line 32 to recovered water return line 54 where it is pumped by pump 58 back to the inlet line 12 for a service filtering pass through the filter vessel 24 and then to the treated water outlet 25. During the recovered water return step, the water return valve 56, inlet valve 22 and outlet valve 26 are open and water recovery valves 40 and 42 and rinse valve 38 are closed so that the returned water is filtered through filtering vessel 24 along with the main inlet stream.

It should be apparent from the foregoing that the backwash and rinse recovery system of the invention recovers the treated water used for backwashing and rinsing which has heretofore been discharged to a sewer or the like. This results in significant economy because almost all water subjected to the treatment chemicals from feed lines 14, 16 and 18 is processed by the treatment system and is available for use, in contrast to the waste inherent in merely disposing of the backwash and rinse water. The recovery system also has advantages from an ecology point of view because polluted backwash and rinse water is not placed in a sewer.

The time required to backwash and rinse a filter vessel, i.e., the time that the system is not in service outputting treated water, is relatively short in comparison with the period of time that any given filtering vessel is treating water before it requires backwashing and rinsing. It is therefore preferred that any given water recovery system be employed to service more than one filter vessel 24. To amplify, the backwash water from a plurality of filters 24 should be transferred to a smaller number of recovery basins 34.

Figure 2:
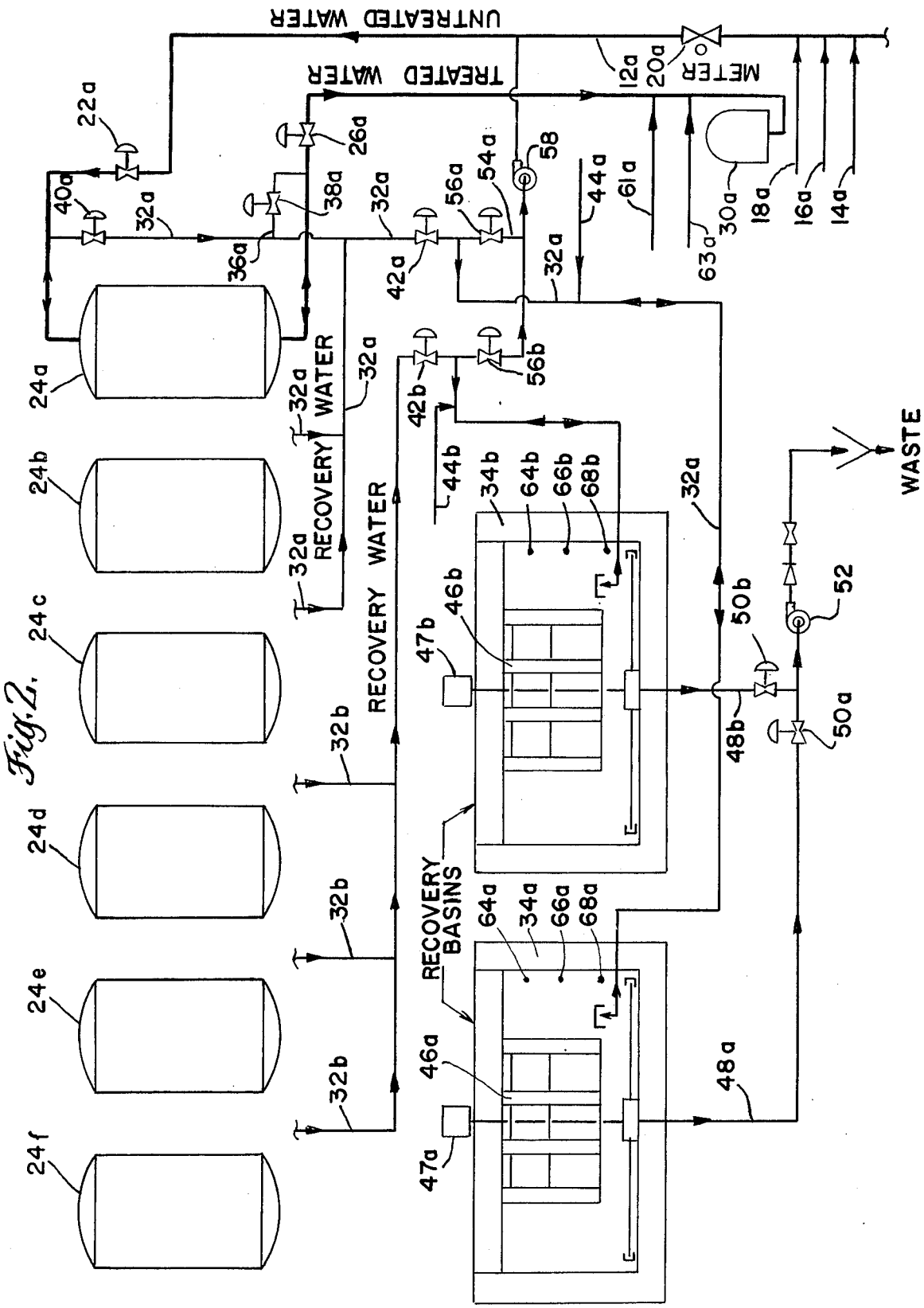
FIG. 2 is a diagrammatic representation of a backwash and rinse water recovery system according to the invention in which two recovery basins are employed in conjunction with six filters.

This is illustrated diagrammatically in FIG. 2, wherein six filter vessels 24a, 24b, 24c, 24d, 24e, and 24f are serviced by two recovery basins 34a and 34b. Each of the filter vessels 24a-f has inlet and outlet equipment and backwash water and rinse water recovery lines and valving similar to those shown in FIG. 1. For the sake of simplicity, only the piping and valving associated with filter vessel 24a is shown, although it should be understood that each of the remaining five filter vessels has a similar complement of such equipment. The numerals used to designate the various lines and valves associated with filter vessel 24a in FIG. 2 are identical to the numerals used to designate the corresponding parts in FIG. 1, but with suffixes.

The backwash water and rinse water recovered from filter vessels 24a-c is fed to recovery basin 34a via water recovery lines 32a. Coagulating agent feed line 44a feeds into water recovery line 32a. Similarly, the backwash water and/or rinse water recovered from filter vessels 24d-f passes to recovery basin 34b via water recovery lines 32b and is injected with a coagulating agent from coagulating agent feed line 44b.

The overall sequence of operation of the system shown in FIG. 2 is as follows. The service or filtering cycles of filter vessels 24a and 24d are interrupted and those filter vessels are backwashed and preferably rinsed with the backwash and rinse water directed respectively to recovery basins 34a and 34b, where the water is mixed with a coagulating agent. Once backwashing and rinsing have been accomplished, the filter units are returned to service operation, and the mixing means or paddles 46a and 46b are deenergized so that the precipitates in the recovery water may settle to the bottom of the recovery basins. Settling normally requires on the order of 30 to 80 minutes. At the end of settling, the treated water, from which precipitates have been removed, that remains at the top of the recovery basins is passed back to the inlet lines for the respective filters 24a and 24d after the sludge is removed from the bottom of the collection basins by opening sludge valves 50a and 50b and energizing sludge pump 52. When the recovery basins 34a and 34b are emptied and the recovered water has been passed through the filters and the sludge has been removed, the cycle is then repeated to backwash and rinse filter vessels 24b and 24e, at the end of which cycle the process is again repeated to backwash and rinse filter vessels 24c and 24f.

In operatively connecting each recovery basin to a greater number of filter vessels, the recovery basins are utilized more economically than if one recovery basin is used to service one filter vessel only.

It is preferred that the system be operated and controlled automatically so as to minimize manpower required to operate and to supervise it. Automatic control means for controlling the system is illustrated diagrammatically in FIG. 3 wherein the various valves, pumps and other equipment are shown electrically connected to a program timer 60, such as the program timer manufactured by Automatic Timing & Controls of King of Prussia, Pennsylvania, and sold under the trade designation ATC Model 2300 Cam Timer. In FIG. 3, the program timer 60 is shown electrically connected to valves, pumps and the like of only one filter vessel 24a of the system. This is solely for illustrative purposes, and it should be understood that the program timer 60, in operation, also controls the operation of filter vessels 24b–24f. The sequence of operation of each filter system is identical and those skilled in the art will be able to understand the invention from the following description of the operation of one system.

The valves 22a, 26a, 38a, 40a, 42a, 50a, and 56a may be any one of a number of electrically or pneumatically actuated valves now available, such as those manufactured by Centerline, Inc. of Tulsa, Okla., under the trade designation 29000 Pneumatically Operated Butterfly Valve. In preferred form, each of these valves is pneumatically operated by an electrically activated valve connected to the timer 60, such as the solenoid valves made by Automatic Switch Co. of Florham Park, N.J., under the trademark ANSCO.

The contacts of the program timer 60 for filter 24a are set so that unless the program timer is activated, the filter is in service for filtering operation, in which inlet valve 22a and outlet valve 26a are open, rinse valve 38a, recovery valves 40a and 42a and return valve 56a are closed, and the inlet pump 10 and chemical feed pumps for lines 14a, 16a, and 18a are energized.

When it is desired to backwash and preferably rinse the filter vessel 24a, the program timer is activated whereupon the following sequence of events occurs. Initially, the inlet valve 22a is closed, and recovery valves 40a and 42a are opened to place the system in the backwashing condition. At the same time, the coagulating agent feed pump for line 44a is activated to add the coagulating agent to the recovery basin 34a, and the paddle drive motor 47a is energized to rotate the mixing paddles 46a, whereby the filter is backwashed and the backwash water passes into and progressively fills the recovery basin 34a. Backwashing normally requires approximately 10 minutes, and it is preferred to use the level of recovered water in the recovery basin as the control to determine the end of the backwashing stage of the cycle. To that end, a pressure sensitive switch 64a (see FIG. 2) is positioned in the recovery basin at a level selected to designate the end of the backwashing stage of the recovery cycle. When the water level in the recovery basin has reached a predetermined point, the pressure sensitive switch 64a actuates the program timer 60 to switch the system to the rinsing stage of the cycle.

In the rinsing stage, the inlet valve 22a is opened, the outlet valve 26a is closed, rinse valve 38a is opened, recovery valve 40a is closed, and valve 42a remains open. Throughout the rinsing stage, the inlet pump and chemical feed pumps, coagulating agent pump and paddle drive remain energized. The program timer maintains the system in rinsing condition for a predetermined period of time, such as for example approximately 5 minutes. The rinse water passes to recovery basin 34a where it is mixed with the coagulating agent from line 44a.

At the end of the rinsing stage, the program timer automatically resets the system valving back to service condition, that is the inlet valve 22a and outlet valve 26a are opened and the valves 38a, 40a, 42a, and 56a are closed so that the filter vessel 24a is again processing and outputting treated filtered water. When the filter system is thus returned to service condition, the recovery basin 34a is placed in its sludge settling stage in which the paddle drive 47a and the coagulating agent feed pump in line 44a are deenergized. The sludge settling stage of the recovery cycle last for a predetermined period of time, such as for example on the order of 30 to 80 minutes. During settling, the precipitates removed from the filter during backwashing and rinsing, after coagulation with the coagulating agent, are allowed to settle out of the recovery water to deposit a layer of sludge at the bottom of the recovery basin. The duration of the settling stage should be such as to allow substantially all of the precipitates to settle, and the coagulating agent introduced to the recovery water via coagulating agent feed line 44a functions to shorten settling time. The precise length of time required for settling is of course dependent on the type and quantity of impurities present in the water being processed and also upon the characteristics of the coagulating agent employed.

At the end of the settling stage, the recovery basin is cleansed of the settled sludge by opening desludging valve 50a and energizing desludging pump 52 so that the sludge is removed from the bottom of the tank and disposed of. The desludging state preferably is controlled by the reduction of water level in the recovery basin by virtue of removal of the sludge, and for this purpose a second pressure sensitive switch 66a (see also FIG. 2) is positioned in the recovery basin 34a below the location of pressure sensitive switch 64a at a predetermined distance selected so that a lowering of water level equal to the distance between the switches 64a and 66a indicates that substantially all of the sludge is removed from the recovery basin. Sludge removal continues until the water level has dropped to a point where pressure sensitive switch 66a is closed to activate the program timer 60 to place the system in return stage of the recovery cycle.

During the return stage, the program timer 60 opens return valve 56a and energizes return pump 58 so that the clarified water is returned from the recovery basin 34a to the inlet line 12a back through recovery line 32a and through return line 54a.

The recovered backwash and rinse water returns to the filtering system, passes to the filter inlet through the filter and exits from the system as pure treated water. The water return system continues to run until the water level in the collection basin has reached a low level pressure sensitive switch 68a (see also FIG. 2) located near the bottom of the recovery basin 34a, which pressure sensitive switch triggers the program timer 60 to in turn deenergize return pump 58 and close return valve 56a. At this point, the recovery cycle has been completed for the filter vessel 24a.

It should be apparent that the recovery cycle for filter unit 24a and recovery basin 34a takes place at the same time as the recovery cycle for filter vessel 24d and recovery basin 34b. After the recovery cycle for those two filter vessels has taken place, the program timer then switches over so that filter vessels 24b and 24e are backwashed, rinsed, and the backwash and rinse water recovered and returned to the inlet of the filter units in association with recovery basins 34a and 34b, respectively. After the cycle has been completed with respect to these two filter vessels, then the recovery basins are connected to filter vessels 24c and 24f and the cycle is repeated to backwash and rinse these two filter vessels.

It should be apparent that the foregoing detailed description of the preferred embodiment may suggest to those skilled in the art a number of modifications and equivalents thereof which fall within the spirit and scope of the invention as defined by the appended claims.

What is claimed is:

1. A water treatment system comprising a water purification flow circuit extended from a source of water to be purified to the inlet of a filter and thence to a filter outlet line and to a connected community supply line for delivery of purified water to a point of community use, means operable to add at least one treatment agent to the water in a region between said source and the inlet of said filter, a filter backwashing system including a water recovery basin independent of said water purification flow circuit, means for diverting purified water from the filter outlet line of said water purification flow circuit for the purpose of backwashing the filter, said means including a reservoir connected with said outlet line and constructed and arranged to receive and store a portion of the purified water in a quantity sufficient to serve as a temporary community supply during backwashing, the reservoir also being constructed and arranged to provide a head of pressure sufficient to force purified water from said reservoir in reverse flow through the filter and from said filter inlet to said recovery basin, valve means for establishing such reverse flow, means for separating sludge from the water in said recovery basin and for discharging said sludge independently of said water purification circuit, means for returning the sludge-freed water from the recovery basin to said water purification flow circuit between said source and said filter, and means connecting the reservoir with the community supply line for delivering purified water from said reservoir to said community supply line and thus to said point of community use during backwashing.

2. A water treatment system comprising a water purification flow circuit extended from a source of water to be purified to the inlet of a filter and thence to a filter outlet line and to a connected community supply line for delivery of purified water to a point of community use, means operable to add at least one treatment agent to the water in a region between said source and the inlet of said filter, a filter backwashing system including a water recovery basin independent of said water purification flow circuit, means for diverting purified water from the filter outlet line of said water purification flow circuit for the purpose of backwashing the filter, said means including a reservoir connected with said outlet line and constructed and arranged to receive and store a portion of the purified water in a quantity sufficient to serve as a temporary community supply during backwashing, the reservoir also being constructed and arranged to provide a head of pressure sufficient to force purified water from said reservoir in reverse flow through the filter and from said filter inlet to said recovery basin, valve means for establishing such reverse flow, means for compacting said filter including means for establishing a flow of water through the filter in the normal flow direction and for diverting such compacting water from the purification flow circuit, after passage through the filter, to the recovery basin, the means for establishing the flow of compacting water through the filter being connected to derive the compacting water from said source, means for separating sludge from the backwashing and compacting water in said recovery basin and for discharging said sludge independently of said water purification circuit, means for returning the sludge-freed backwashing and compacting water from the recovery basin to said water purification flow circuit between said source and said filter, and means connecting the reservoir to the community supply line for delivering purified water from said reservoir to said community supply line and thus to said point of community use during backwashing and compacting.

3. A water purification process comprising flowing the water to be purified through a purification flow path extended serially from a source to the inlet of a filter and thence from the filter outlet for delivery of purified water to a point of community use, adding at least one treatment agent to the water in a region between the source and the inlet of the filter, diverting a portion only of said purified water and storing such portion in a backwash reservoir, backwashing the filter by terminating normal flow therethrough and passing diverted purified water in reverse direction through the filter to the filter inlet and thence to a recovery basin, compacting said filter by flowing water through the filter in normal flow direction and by diverting the compacting water from the purification flow path, after passage through the filter, and returning such water to the recovery basin, the compacting water being derived from said source, separating sludge from the backwashing and compacting water in the recovery basin and discharging the separated sludge from said basin independently of the purification flow path, and returning sludge-freed backwashing and compacting water from the recovery basin into the purification flow path at a point upstream of the filter.

4. A process as defined in claim 3 in which, during the backwashing, purified water is supplied to the point of community use from the backwashing reservoir.

* * * * *